J. Cory,
Bee Hive.

No. 104,832.         Patented June 28, 1870.

Witnesses:
Phil. T. Dodge
Thomas Taylor Jr.

Inventor:
J. Cory
by Dodge & Munn
his Attys

United States Patent Office.

JEREMIAH CORY, OF HOLDEN, MISSOURI.

Letters Patent No. 104,832, dated June 28, 1870.

IMPROVEMENT IN BEE-PROTECTOR.

The Schedule referred to in these Letters Patent and making part of the same.

*To all whom it may concern:*

Be it known that I, JEREMIAH CORY, of Holden, in the county of Johnson and State of Missouri, have invented certain Improvements in Bee-Protector, of which the following is a specification, reference being had to the accompanying drawing.

My invention consists in so combining and arranging a poultry-roost with the gates of one or more bee-hives, that the perching of the poultry upon the roost will serve to automatically close the entrance to the hives; the object of the arrangement is to insure the closing of the hives at night, so as to exclude the bee-moth, and the opening of the same in the morning, to permit the passage of the bees in and out during the day.

Figure 1:
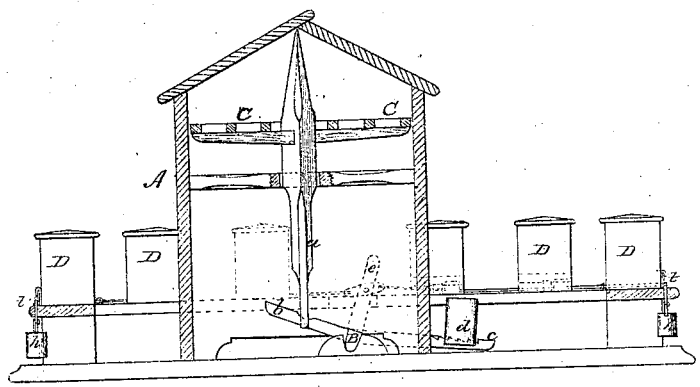
Figure 2:
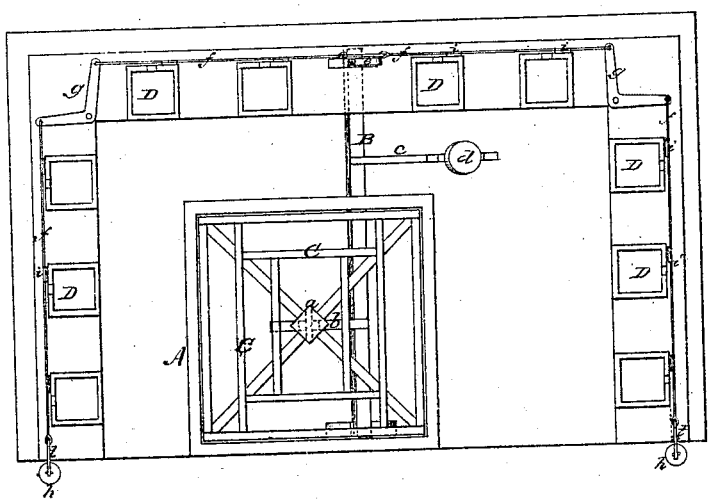

Figure 1 represents a vertical section of one of the many forms in which my invention may be arranged, and Figure 2 is a top plan view of the same.

In the drawing—

A represents an ordinary poultry-house, and

B, a horizontal rock-shaft, secured in suitable bearings, and provided with three arms, $b$, $c$, and $e$, the latter located within the house A, and supporting the lower end of a vertical sliding post, $a$, supported in suitable guides, and bearing upon its upper end the roost or perches C.

The arm $c$ is upon the opposite side of the shaft from arm $b$, and is provided with an adjustable weight, $d$, sufficient to overbalance the post $a$, and keep it elevated when the roosts are unoccupied, but which allows the post to descend upon the roost being occupied, and thereby operate the shaft and its vertical arm $e$, this arm standing in one position when the roost is occupied by the poultry, and in the opposite position when the roost is vacated.

D are the hives, arranged in rows, and each provided with a sliding door or gate, $i$, the whole series of the gates being connected by rods, wires, or chains $f$, so as to open and close together, the rods $f$ having weights $h$ connected to their ends by levers $t$, which tend to hold the gates open.

The upright arm $e$ of the rock-shaft is connected by an eye-block with the rod $f$, so that, as the arm is vibrated by the rocking of the shaft, it will open and close the gates of the whole series of hives.

When the devices are thus constructed and arranged, and the roost B is unoccupied, the various parts stand in the positions shown in figs. 1 and 2, with the entrance to all the hives open; but, as soon as the poultry mount upon the roost, their weight depresses the post $a$, and it, in turn, presses down arm $b$, and thereby rocks shaft B and its arm $e$, and the latter operates the rods $f$, and closes all the hives.

As soon as the roost is vacated, the weights $d$ and $h$ bring the parts to their original positions, elevating the post $a$, and opening the slides $i$ of the hives.

As is well known, the bee-moth flies during darkness only, and, therefore, to exclude them, the hives must be closed at dusk and allowed to remain closed during the night, and then be opened again in the marning for the bees to pass in and out during the day; when, now, in connection with these requirements, it is remembered that the poultry always and invariably roost at dusk, and leave the roost at or near daybreak, it will be seen with what perfect regularity and certainty my device will fulfil its purpose of closing and opening the hives at the proper times.

By the use of this arrangement all danger of the hives being left open at night or closed during the day is avoided, and a certainty of action attained that would be impossible were the operation left for an attendant person liable to forget, or to be absent or sick.

It is obvious that any number of hives may be connected with the roost, and all be operated simultaneously, they being arranged in any suitable position to have their slides connected with the operating devices.

Having thus described my invention,

What I claim is—

The combination of a vibrating roost or perch for fowls, with the slides or doors of one or more bee-hives, when so constructed and arranged that the weight of the fowls upon the roost shall operate to close the hives, and their removal from the roost shall open the hives, substantially as herein described.

JEREMIAH CORY.

Witnesses:
G. D. CARPENTER,
ABNER VAN MATRE.